United States Patent
Elnozahy

(10) Patent No.: US 6,625,635 B1
(45) Date of Patent: *Sep. 23, 2003

(54) DETERMINISTIC AND PREEMPTIVE THREAD SCHEDULING AND ITS USE IN DEBUGGING MULTITHREADED APPLICATIONS

(75) Inventor: Elmootazbellah Nabil Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/184,245

(22) Filed: Nov. 2, 1998

(51) Int. Cl.[7] ................................................ G06F 9/00
(52) U.S. Cl. ...................................... 709/102; 709/100
(58) Field of Search ................................ 709/100, 101, 709/102, 103, 104, 105, 106, 107, 108, 214, 216, 218, 219, 201, 203, 205, 224; 712/245; 714/47

(56) References Cited

U.S. PATENT DOCUMENTS

| | | | | |
|---|---|---|---|---|
| 5,203,002 A | * | 4/1993 | Wetzel | 395/800 |
| 6,212,542 B1 | * | 4/2001 | Kahle et al. | 709/102 |
| 6,360,243 B1 | * | 3/2002 | Lindsley | 709/103 |
| 6,418,460 B1 | * | 7/2002 | Bitar | 709/108 |
| 6,421,701 B1 | * | 7/2002 | Elnozahy | 709/100 |

* cited by examiner

Primary Examiner—Majid Banankhah
(74) Attorney, Agent, or Firm—Casimer K. Salys; Bracewell & Patterson, L.L.P.

(57) ABSTRACT

A computer system which permits deterministic and preemptive scheduling of threads in a software application. In one embodiment, a scheduler is utilized to schedule the threads in a queue. Once the threads are scheduled, they are divided up into instruction slices each consisting of a predetermined number of instructions. The scheduler executes each instruction slice. An instruction counter is utilized to keep track of the number of instructions executed. The thread is permitted to run the instruction slice until the predetermined number of instructions has been executed. Alternatively, the thread stops if it is blocked while waiting for an input, for example. The next thread is then executed for the same number of instructions. This process permits for the efficient debugging of software which utilizes traditional cyclic debugging.

33 Claims, 4 Drawing Sheets

DETERMINISTIC AND PREEMPTIVE THREAD SCHEDULING AND ITS USE IN DEBUGGING MULTITHREADED APPLICATIONS

BACKGROUND OF THE INVENTION

1. Field of the Invention

The present invention generally relates to computer systems, and more particularly to a method for deterministic and pre-emptive thread scheduling. Still more particularly, the present invention relates to a method for deterministic and pre-emptive thread scheduling utilized to support cyclical debugging of multithreaded applications.

2. Description of the Related Art

The basic structure of a conventional computer system includes a system bus or a direct channel that connects one or more processors to input/output (I/O) devices (such as a display monitor, keyboard and mouse), a permanent memory device for storing the operating system and user programs, (such as a magnetic hard disk), and a temporary memory device that is utilized by the processors to carry out program instructions (such as random access memory or "RAM").

When a user program runs on a computer, the computer's operating system (OS) first loads the program files into system memory. The program files include data objects and instructions for handling the data and other parameters which may be input during program execution.

The operating system creates a process to run a user program. A process is a set of resources, including (but not limited to) values in RAM, process limits, permissions, registers, and at least one execution stream. Such an execution stream is commonly termed "thread." The utilization of threads in operating systems and user applications is well known. Threads allow multiple execution paths within a single address space (the process context) to run concurrently on a processor. This "multithreading" increases throughput and modularity in multiprocessor and uniprocessor systems alike. For example if a thread must wait for the occurrence of an external event, then it stops and the computer processor executes another thread of the same or different computer program to optimize processor utilization. Multithreaded programs also can exploit the existence of multiple processors by running the application program in parallel. Parallel execution reduces response time and improves throughput in multiprocessor systems.

FIG. 1 illustrates multithreading in a uniprocessor computer system 10, which includes a bus 18 that connects one processor 12 to various I/O devices 14 and a memory device 16. Memory device 16 contains a set of thread context fields 20, one for each thread associated with a particular process. Each thread consists of a set of registers and an execution stack 24. The register values are loaded into the CPU registers when the thread executes. The values are saved back in memory when the thread is suspended. The code that the thread runs is determined by the contents of a program counter within the register set. The program counter typically points to an instruction within the code segment of the application program. Memory device 16 further contains all of the logical addresses for data and instructions utilized by the process, including the stacks of the various threads. After a thread is created and prior to termination, the thread will most likely utilize system resources to gain access to process context 22. Through the process context 22, process threads can share data and communicate with one another in a simple and straightforward manner.

Thread scheduling is an important aspect of implementing threads. In a first category, there are cooperative threads which do not rely on a scheduler and cooperate among themselves to share the CPU. Because of the complexities involved in programming such threads, and because they cannot react quickly to external events, cooperative threads are not utilized much in the art nowadays. In a second category are pre-emptive threads. Such threads rely on a scheduler that can decide to switch the CPU from one thread to another at any point during the execution. Pre-emptive threads react quickly to external events because the currently running thread could be pre-empted out of the CPU and another thread takes over to handle the emergency, if needed. Unlike cooperative threads, pre-emptive scheduling relieves the programmer from the burden of implementing the scheduling mechanism within the application program.

Pre-emption of a running thread can generally occur at any point during program execution. Typically, pre-emption occurs when a timer expires allowing the scheduler to intervene and switch the CPU among threads. In the art, this is referred to as "time slicing" the CPU among threads, and each thread is said to run for a "time slice." This form of intervention allows the scheduler to implement various scheduling mechanisms, including round robin, priority scheduling, among others. Additionally, pre-emption could also occur in response to external events that may require the immediate attention of some thread.

However, when two copies of the same program run on two different machines, the timer interrupts do not preempt the threads at the same execution points because of the differences in the clock speeds of the two machines. This effect results in the threads potentially accessing shared memory in different orders on the two machines, yielding different results. FIG. 2 illustrates this effect.

FIG. 2 shows what occurs when the same set of threads 32 are run on two different processors, Processor A 36a and Processor B 36b, utilizing time slicing. Processor A 36a runs at one clock speed and executes the threads as shown in Output A 38a. Processor B, runs at a slightly different clock speed and executes the threads as shown in Output B 38b. The processors yield different outputs from threads running identical programs. The output connected to "write X" will depend on which thread wrote to that variable last, and this is in turn varies depending on whether Processor A 36a or Processor B 36b is utilized. Thus, one "write X" 39a yields a different output from "write X" 39b. Similarly, the output of "write Y" differs between the two processors. Processor A 36a yields the value read during execution, while Processor B 36b yields an unknown value stored prior to the thread's execution. Such inconsistencies are common when utilizing time slices as done in the current art, making the current art incapable of supporting cyclical debugging of multithreaded applications. Cyclical debugging requires that two runs of the same program produce the same outputs and go through the same execution paths. In the example we have shown in FIG. 2, the two different results may correspond to two different runs on the same processor making debugging very difficult.

The result of the application program often depends on the exact points within the execution streams where pre-emptions occur. Therefore, pre-emptive thread scheduling in a multithreaded program is a source of nondeterminism that affects its final results. If a multithreaded application runs twice on the same machine, the threads may access shared memory in different orders to yield different results. Thus, even if the program starts with the same input on the same machine, two runs of the program may yield different results.

One method of debugging is discussed in a 1989 article by Mellor-Crummey and LeBlanc. The article, "A Software Instruction Counter," describes a method for debugging utilizing a software instruction counter; however, unlike this invention, the article does not rely on any particular scheduling support, and assumes the utilization of timers. Thus, in their technique they generate a log record each time a timer expires, making the log size impracticably large. This invention solves this problem via an innovative scheduling mechanism that can also support efficient debugging and general purpose preemptive and deterministic scheduling, when such scheduling is needed.

It would therefore be desirable and advantageous to provide an improved method of cyclical debugging by scheduling of threads in a way which would be deterministic and preemptive.

SUMMARY OF THE INVENTION

It is therefore one object of the present invention to provide an improved method and system of scheduling threads on a computer CPU.

It is another object of the present invention to provide such a method and system whereby said thread scheduling will be preemptive and deterministic.

It is yet another object of the present invention to provide such a method and system which does not depend on time slices, but utilizes a more accurate method of instruction slices so as to be able to reproduce execution of threads for utilization in debugging.

The foregoing objects are achieved as is described now in a computer system generally comprising a CPU connected to a memory which is comprised of a process context and a series of one or more threads. Additionally, the computer system includes an instruction counter. An instruction counter is a register that counts down by one each time a thread executes an instruction on the CPU. When the count reaches zero, the counter generates an interrupt that activates the scheduler. The counter can exist in hardware or can be emulated in software. In the disclosed embodiment, the scheduler allocates "instruction slices" on the CPU, such that each slice consists of executing N instructions (N is fixed). At the beginning of each instruction slice, the instruction counter is set to N. The thread then executes until one of several terminating events occurs, for example, it either executes N instructions, stops to wait for input, or blocks on a synchronization variable. When any of these events occurs, a new thread is scheduled, and its instruction slice executes until one of the terminating events occurs. The process is repeated until all of the threads are completed.

New threads may be admitted into the sequence. This is controlled by an admission control window (ACW) which permits the new threads to be appended to the queue every K instruction slices.

This support ensures a deterministic and pre-emptive scheduler that is repeatable across different application runs. This feature can be utilized to support cyclical debugging. This is true because the invention described herein forces the threads to access shared variables in the same order and eliminates all sources of nondeterminism from scheduling. A log is utilized by the debugger to record the events of thread creation, thread admission to the instruction queue, and input values. This enables practical debugging without the need for having the log record the state of the program each time a timer expires.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
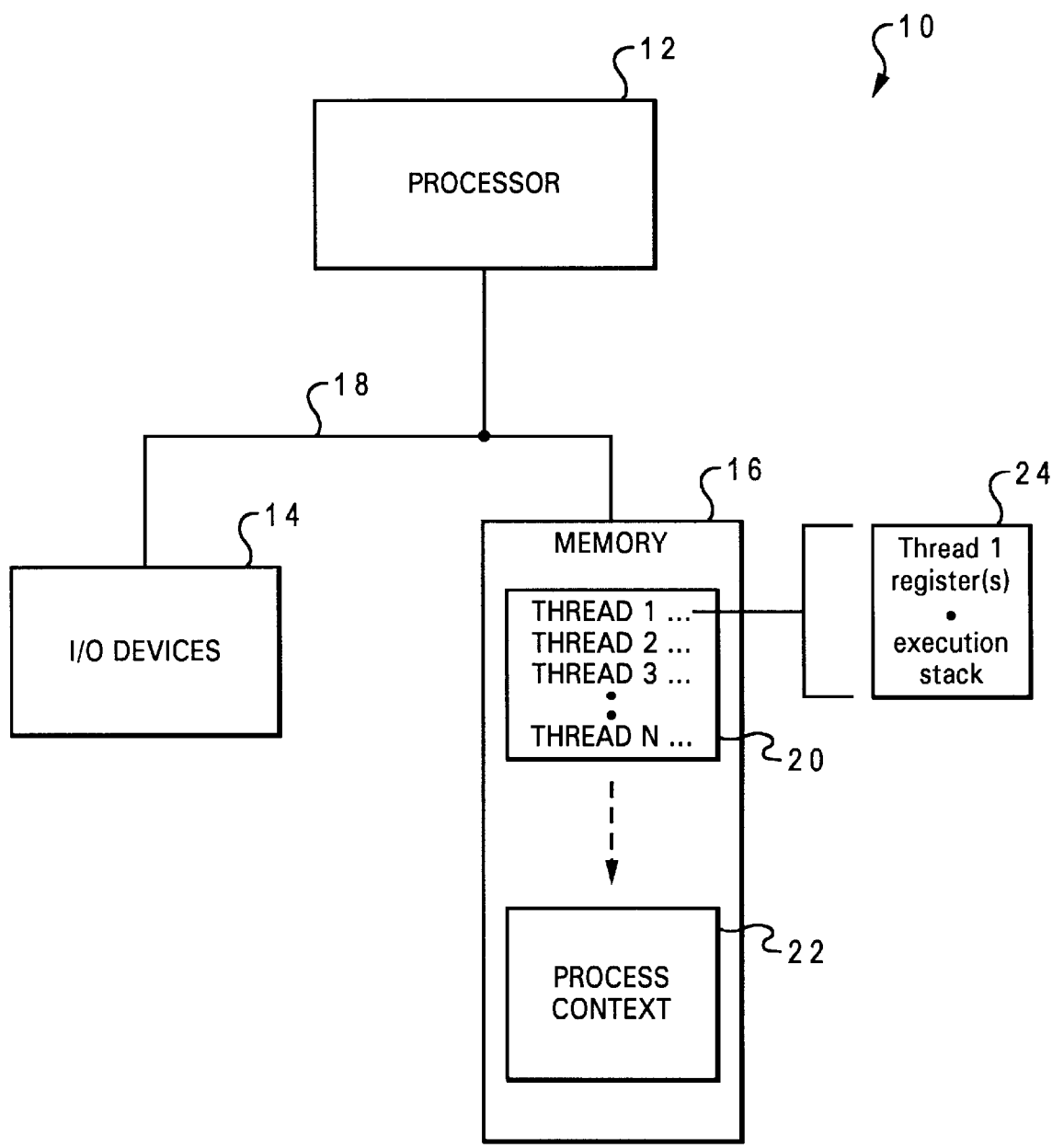
FIG. 1 is a block diagram of a conventional data processing system which is utilized to implement multithread programming.
Figure 2:
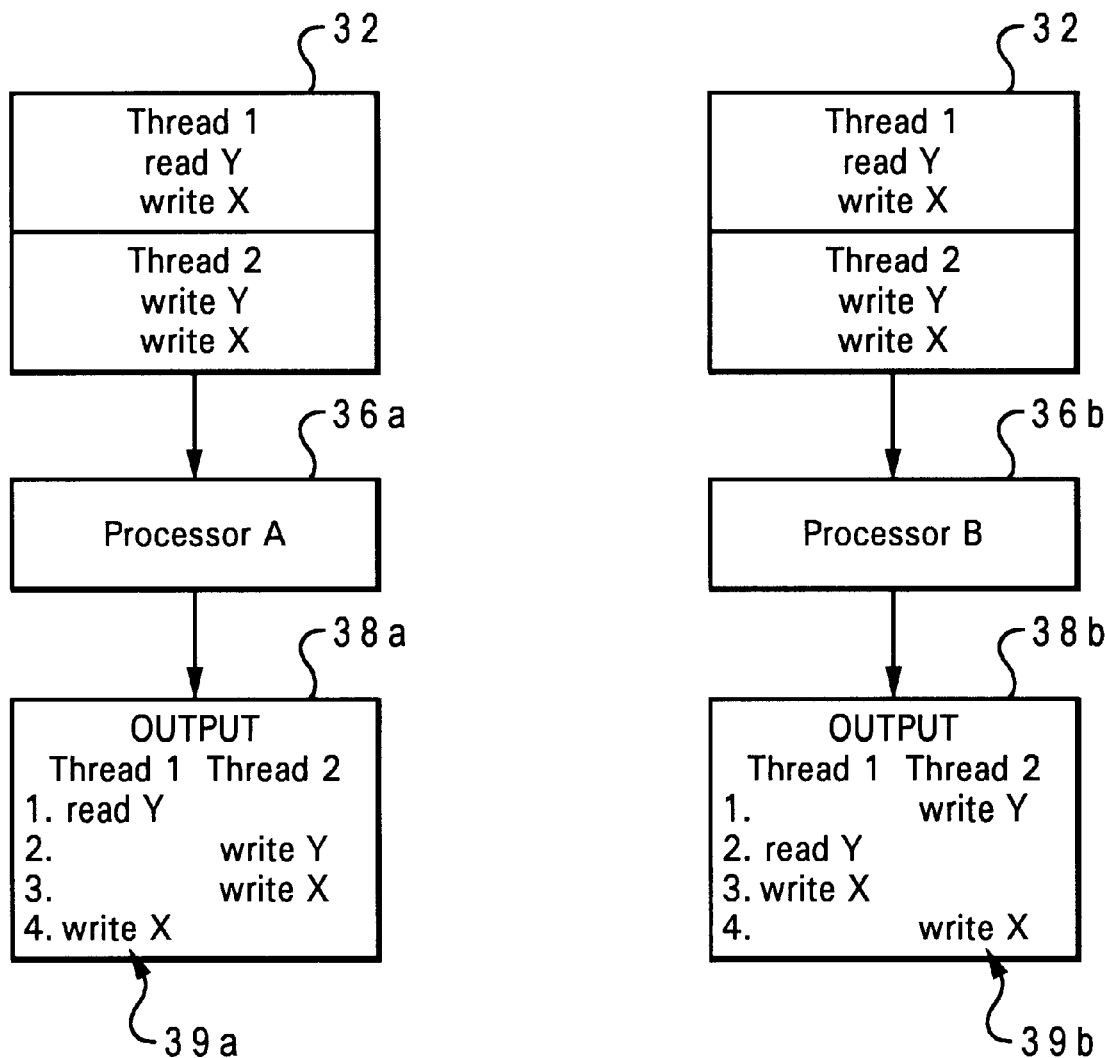
FIG. 2 is a block diagram depicting the scheduling of a set of identical threads in two different processors which utilize conventional time slices.
Figure 3:
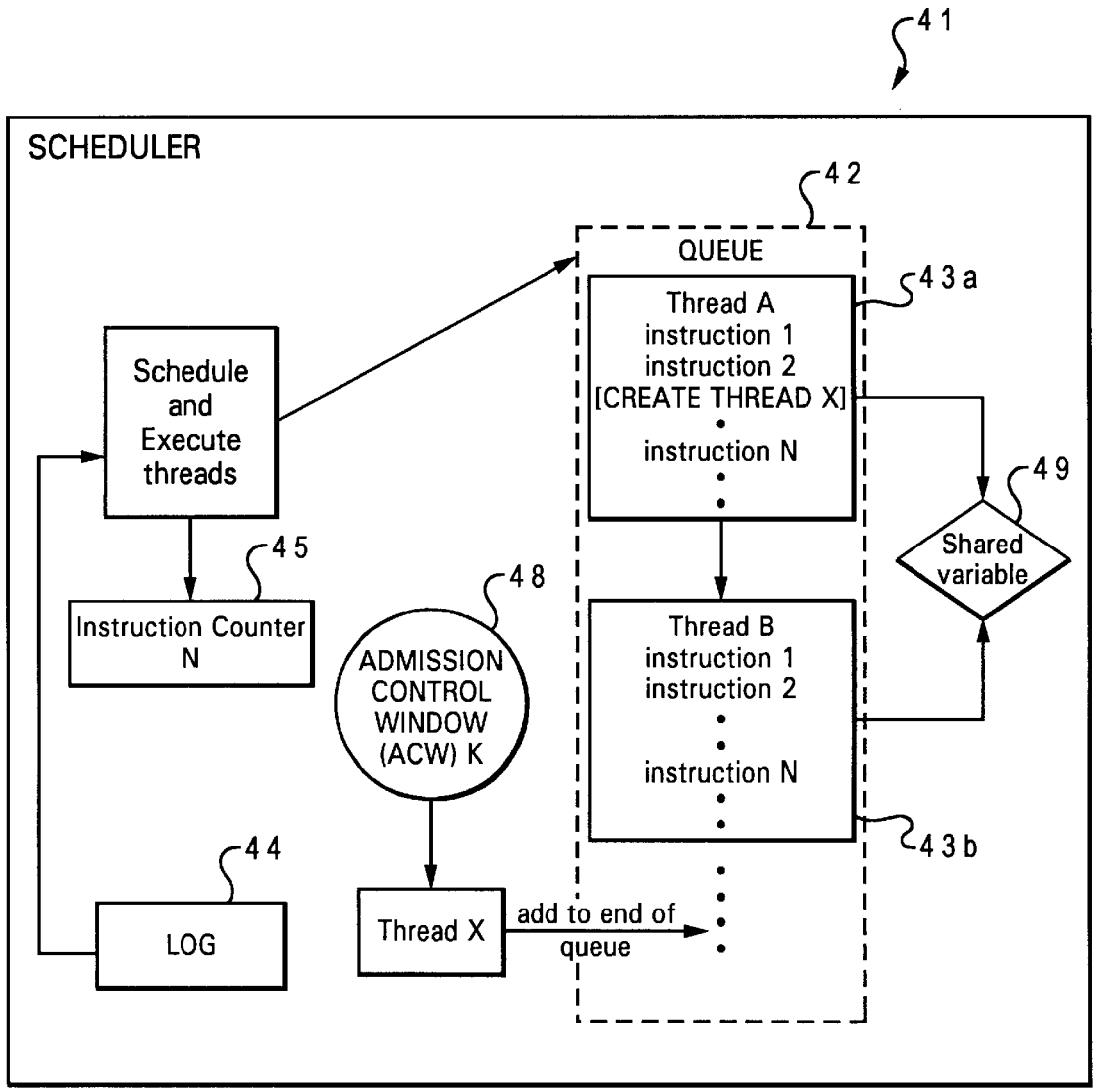
FIG. 3 is a block diagram depicting one implementation of an instruction sliced multithread scheduler in accordance with the present invention.

With reference now to the figures, and in particular with reference to FIG. 3, there is depicted one embodiment of an instruction sliced thread scheduler 41. In the depicted embodiment, scheduler 41 operates on a series of one or more threads placed in a queue 42 and schedules them as described herein.

Scheduler 41 includes the traditional data structures required to support the scheduling mechanism as is commonly implemented in the art. Main memory of the data processing system contains said data structures along with the code for implementing scheduler 41. Additionally, and unlike existing art, scheduler 41 includes an instruction counter 45 which is a register that counts down by one each time a thread executes one instruction on the CPU. Instruction counter 45 is given a chosen value, N, prior to the beginning of the scheduling process. When instruction counter 45 reaches zero, it generates an interrupt that activates the scheduler. This instruction counter 45 could be available in hardware in the form of a CPU register, or it can be emulated in software. The invention described herein works with either variety. Moreover, the scheduler's design departs from prior art in that it does not rely on timers.

The present invention implements deterministic and pre-emptive thread scheduling. Scheduler 41 allocates "instruction slices" on a CPU, where an "instruction slice" is defined to be a scheduling unit during which a thread executes a pre-specified number of instructions, N, before it is pre-empted. Thus, for the purposes of the present disclosure, scheduling by "instruction slice" means scheduling a thread based upon a number of instructions executed and not based upon a time of execution or number of execution cycles. The instruction slice is implemented with the help of instruction counter 45. At the beginning of a slice, instruction counter 45 is set to N. As the thread executes within the instruction slice, the counter is decremented by one for each instruction executed. When the instruction counter reaches zero, an interrupt forces the thread to be pre-empted and scheduler 41 takes over. Scheduler 41 performs the necessary context switching and possibly brings in another thread to run, or decides to allow the existing thread to continue running. In either case, a new instruction slice begins by setting instruction counter 45 to N as already described.

The state of a thread A 43a is uniquely determined by the initial state at the time it started, the stream of instructions that it has executed, and the input it has received. If the thread is given the same initial state, runs a given number of instructions and receives the same input during this run, the state of the thread will always be the same after executing the said number of instructions in any different runs. In prior art, however, nondeterminism occurs when the thread is pre-empted at some random location (e.g. as a result of a timer expiration). The pre-emption may allow another thread B 43b to modify a shared variable 49 that thread A 43a will read later. Because the pre-emption orders the executions of threads A 43a and B 43b, thread A 43a, may read different values in two different runs, depending on whether thread B 43b gets to modify the shared variable 49 before or after thread A 43a reads it. This is uniquely determined by the pre-emption locations, which are not repeatable across multiple runs because of the imprecise nature of computer timers and their independence from the execution of the CPU.

In the present invention, pre-emption occurs at the expiration of an instruction slice. Therefore, pre-emptions will occur at the same locations during any run of the program. Since pre-emptions are the source of nondeterminism that affect the outcome of the program, forcing them to occur at the same location within any program run will force the program to yield the same results if it receives the same inputs. In the example above, if thread B 43b modifies the variable during its second instruction slice, while thread A 43a reads the variable during its third instruction slice, and assuming round robin scheduling, then it follows that thread A 43a will always read the shared variable 49 after thread B 43b modifies it. The outcome is thus deterministic across runs if we utilize the same value N to control the instruction slices.

Scheduler 41 also pre-empts a thread when it decides to relinquish the CPU before its instruction slice expires. This occurs, for instance, if the thread blocks on a synchronization variable or waits for some input as is commonly understood in the art. These events are deterministic on a uniprocessor because the thread will always block or wait for input after the same number of instruction in each run, and therefore the deterministic nature of the scheduling is preserved.

When the program begins execution, scheduler 41 determines the number of threads available, T, and places them in some order in a queue 42. In the disclosed embodiment, only two threads are shown; however, it is contemplated that any number of threads may be available in queue 42. The queuing order determines which threads are executed. Associated with this scheduling mechanism is an admission control window (ACW) 48, which represents the method for permitting new threads created during the running of the application to be placed in the instruction queue. ACW 48 has a predetermined value K which controls its opening and closing. K is decremented by one each time an instruction slice expires. After K instruction slices have expired, the scheduler admits new threads. These new threads may be generated during the execution of the application. They may also be created in response to external events. The new threads are put on hold until the value of K reaches 0. The selection of K thus controls how responsive the system can be to external events, while avoiding the utilization of timers that introduce non-determinism.

We now describe how to utilize this scheduling mechanism to support cyclic debugging of multithreaded applications.

Cyclic debugging is the most common technique utilized to debug sequential programs but does not always work for multithreaded programs. In traditional cyclic debugging, the program is repeatedly executed, and each successive execution provides additional information/data about the execution path. To enable debugging, it is necessary to rerun the program with the same input and the same scheduling decisions as in the initial run(s). But in the current art, successive runs of the same multithreaded program may take different execution paths, depending on where thread pre-emptions occur. Since such pre-emptions are implemented by timers, they cannot generally occur at the same execution points from one run to the next.

To enable cyclical debugging of multithreaded applications, scheduler 41 described herein is augmented with a log 44. During the application run, log 44 records events for the benefit of an execution replay during debugging. Specifically, log 44 contains an entry each time a new thread is admitted to the system, and also contains an entry describing the input that the application receives (not necessary if the application reads immutable objects, such as read-only files or files that do not change across an application run).

A debugger can thus restart the application. The scheduling utilizes the same instruction slice size, thus applying pre-emption at the same points as during the initial run. The debugger then utilizes log 44 to admit threads at the same point where they were admitted in the initial run and replay the same input that was available during the initial run.

The debugger thus can replicate the same execution of the application across multiple runs and yield the same results. It is interesting to compare this approach with others that have tried to utilize the instruction counters to support debugging. In the original paper by Mellor-Crummey and LeBlanc, log 44 also kept track of the number of instructions between timer events and accesses to synchronization variables (in addition to recording when a thread was admitted in the system and the input). The volume generated by such logging can be quite large rendering the technique impractical. The present invention does not rely on timers and therefore does not require the addition of an entry to log 44 each time a timer expires as in Mellor-Crummey and LeBlanc's technique. The resulting technique thus allows debugging with minimal overhead in storage and time during the initial run.

Figure 4:
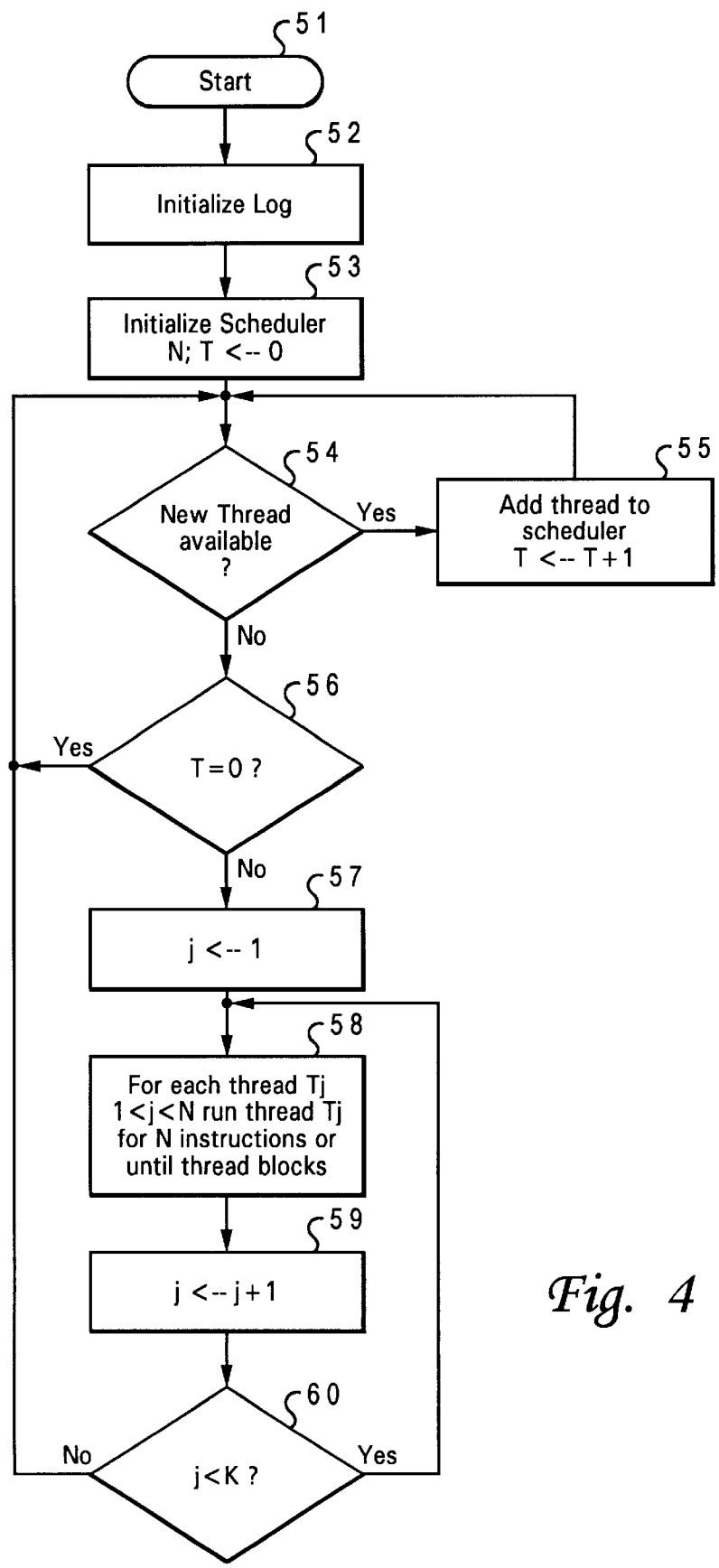
FIG. 4 is a flow chart depicting the logic flow of the method of scheduling threads utilizing instruction slices in accordance with one implementation of the present invention.

The working of scheduler 41 and ACW 48 may be further understood with reference to FIG. 4. In the preferred embodiment, a uniprocessor system is being utilized as the hardware which best supports the invention. There may be other hardware forms which can be utilized in implementing the essential processes. The debugging support described herein also can be added to an existing debugger when needed.

The preferred embodiment maybe further understood with reference to the flowchart of FIG. 4. Following the logic flow of this embodiment, the processing of a thread scheduler is shown. Once the process starts at Block 51, log is initialized at Block 52 and the counter variables N and T utilized in the process are set in Block 53. The N variable has a predetermined value which determines the number of instructions in each slice and counts down as each thread is executed. The T variable is initialized to zero and serves as the counter for the number of threads in the queue. The scheduler then determines the number of threads available and places them in a queue which is a part of the scheduler.

To determine this figure, the scheduler checks for the availability of new threads at Block 54. If a new thread is available the T variable is incremented by one and the thread placed in queue in Block 55. This process continues until no additional new threads are available. The scheduler then checks at Block 56 to make sure that there are threads in the queue to be scheduled. If there are threads in the queue, the scheduler then begins to execute each thread in slices in Block 58 beginning with the first thread. The ACW counter variables j is set to one at this time at Block 57. The threads are made to execute N instructions (or one slice) or until the thread blocks or waits for input in Block 58. After each slice is executed, the ACW counter variable is incremented by one Block at 59. A check is made to determine if this counter variable has reached a predefined number K which determines when the ACW allows new threads into the queue. The execution of the thread slices continue until this number has been reached. When the ACW counter variable becomes larger than the K value Block 60 then the ACW opens and the process of letting in new threads in Block 54 is called. The entire scheduling process continues indefinitely until all the thread slices have been executed.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, although FIG. 3 illustrates the ACW as having a separate counter, it is possible to share a counter with the scheduler whereby the ACW opens after all the scheduled threads have been executed once. It is therefore contemplated that such modifications can be made without departing from the spirit or scope of the present invention as defined in the appended claims.

What is claimed is:

1. A method of scheduling threads in a multi-threaded data processing system, said method comprising:

obtaining a plurality of threads being scheduled to run on a processor of said data processing system, said plurality of threads including at least a first thread and a second thread;

allocating an instruction slice parameter, N, on said processor for each thread; and scheduling threads in a deterministic and preemptive manner utilizing instruction slices of said threads, wherein each instruction slice includes a set number of instructions equal to N, and only a first instruction slice of the first thread is executed before passing execution to a second instruction slice of the second thread, and wherein further, N is constant and represents a subset of a total number of instructions in a thread such that a single thread may be executed as multiple instruction slices, one instruction slice at a time.

2. The method of scheduling threads of claim 1, further comprising:

setting an instruction counter to N at the beginning of processing of each instruction slice;

tracking the number of instructions of a thread that is executed utilizing said instruction counter; and generating an interrupt to halt processing of a particular thread when N instructions have been executed to enable scheduling of an instruction slice of a next thread for processing.

3. The method of scheduling threads of claim 2, further comprising the steps of:

placing threads in a queue to determine the order of execution, wherein one slice of each thread is executed in the order of the threads in the queue followed by a next slice of the threads in said order until all instructions of each thread in said queue have been executed; and admitting new threads into said queue by utilizing an admission control window, wherein said new threads are made to wait until the processor completes processing of slices of a set number of the threads within the queue and admits at least one thread waiting to be admitted to the queue.

4. The method of scheduling threads of claim 3, wherein each thread is executed one slice at a time and when a thread has multiple slices of instructions, a first slice is executed up to N instructions or an occurrence of a terminating condition and, when a terminating condition occurs, a second slice beginning at the instruction following the instruction associated with the terminating condition is provided when said thread is later scheduled for execution up to N instructions or the occurrence of another terminating condition.

5. The method of scheduling threads of claim 4, wherein said terminating condition comprises a block on a synchronization variable, and a given thread executes N instructions per an instruction slice and less than N instructions when the thread blocks on a synchronization variable before said thread is re-scheduled for later execution.

6. The method of scheduling threads of claim 5, further comprising placing the thread at the end of the queue when the given thread is no longer blocked.

7. The method of scheduling threads of claim 3, wherein said terminating condition comprises a wait for input, and a given thread executes N instructions per an instruction slice and less than N instructions up to a point at which the thread stops to wait for input before said thread is re-scheduled for later execution.

8. The method of scheduling threads of claim 3, wherein said admitting new threads by utilizing the admission control window, comprises:

defining a preset constant value corresponding to a number of instruction slices to be executed prior to admitting said new threads, said number of instruction slices constituting a time period between an opening of consecutive admission control windows;

holding newly generated threads in memory during execution of current instruction slices;

tracking a number of instruction slices executed by said processor and comparing against said preset value;

admitting new threads to said queue after a number of instruction slices equal to said preset value has been executed; and placing newly admitted threads at the end of the queue.

9. The method of scheduling threads of claim 3, said method further comprising:

defining constant values of N and said preset value for each run of a program that is run at least twice;

admitting threads at the same point in each subsequent run as in an initial run of the program; and providing the same input in each subsequent run as in the initial run of each thread of the program to enable cyclical debugging of the program from which said threads originate.

10. The method of scheduling threads of claim 9, further comprising:

tracking the point of admitting threads and receiving input and storing them in a log during the initial run of the program, wherein the stored thread admission points and inputs are utilized to determine when to admit threads and provide inputs in subsequent runs, wherein said input includes both internal inputs and external inputs.

11. A scheduler for scheduling threads within a processor of a data processing system that comprises a memory and supports multi-threaded operations, said scheduler comprising:

logic for allocating an instruction slice on a processor of the data processing system for each thread, wherein said instruction slice represents a set number of instructions of each currently scheduled thread that is executed by the processor before a next thread is scheduled for execution in place of the current thread; and logic for scheduling threads in a deterministic and preemptive manner using said instruction slice.

12. The scheduler of claim 11, wherein said scheduler is a software algorithm located in memory of the data processing system and said logic are software coded program modules.

13. The scheduler of claim 11, further comprising means for:

specifying the number of instructions N included in an instruction slice, wherein a number of instructions in an instruction slice is constant and represents a subset of the total number of instructions in each thread such that a single thread may comprise multiple slices;

setting an instruction counter to N at the beginning of processing of each instruction slice;

tracking the number of instructions of a thread that is executed utilizing said instruction counter; and generating an interrupt to halt processing of a particular thread when N instructions have been executed to enable scheduling of a next thread for processing.

14. The scheduler of claim 13, further comprising:

means for placing the threads in a queue for scheduling, wherein said queue operates as a FIFO queue for scheduling threads for execution of instruction slices; and means for executing each thread until N instructions have executed; and means for beginning execution of a next thread once N instructions of a previous thread has executed.

15. The scheduler of claim 13, further comprising means for executing each thread by instruction slices until a particular thread blocks on a synchronization variable, wherein a next thread is executed when said particular thread blocks on said synchronization variable and said particular thread is re-scheduled for later execution.

16. The scheduler of claim 15, further comprising means for placing said particular thread after the other threads running on the processor, when said particular thread is no longer blocked.

17. The scheduler of claim 13, further comprising means for executing each thread by instruction slices until a current thread stops to wait for input, wherein a next thread is scheduled for execution in place of said current thread and said current thread is moved to the end of the queue, wherein further, said current thread moved to the end of the queue waits its turn in the queue until it is scheduled for execution and executes a new instruction slice if said input is received before it is scheduled.

18. The scheduler of claim 13, further comprising means for admitting new threads, said means including logic for:

placing threads in a queue; and admitting new threads into said queue by utilizing an admission control window, wherein, said new threads are made to wait until the processor completes processing of slices of a set number of the threads within the queue and admits at least one thread waiting to be admitted to the queue.

19. The scheduler of claim 18, further comprising logic for:

defining a preset constant value corresponding to a number of instruction slices to be executed prior to admitting said new threads, said number of instruction slices constituting a time period between an opening of consecutive admission control windows;

holding newly generated threads in memory during execution of instruction slices;

tracking a number of instruction slices executed by said processor and comparing against said preset value;

admitting new threads to said queue after a number of instruction slices equal to said preset value have been executed; and placing newly admitted threads at the end of the queue.

20. The scheduler of claim 13 further comprising logic for:

defining constant values of N and said preset value for each run of a program that is being debugged;

admitting threads at the same point in each subsequent run as in an initial run of the program; and providing the same input in each subsequent run as in the initial run of each thread of the program to facilitate cyclical debugging of said program.

21. The scheduler of claim 20, further comprising logic for:

tracking the point of admitting threads and receiving input; and saving said points and inputs in a log during the initial run of the program, wherein said points and inputs are utilized to determine similar points and inputs in subsequent runs of the program.

22. The scheduler of claim 21, further comprising logic for saving external inputs within said log for utilization in subsequent runs.

23. A data processing system comprising:

a storage medium; and a processor coupled to said storage medium and which processes multi-threaded programs with a thread scheduler, said processor comprising logic for:

allocating an instruction slice on said processor for each thread, said instruction slice being a set number of consecutive instructions of a thread that is executed at a time before a next thread is scheduled for execution by the processor; and scheduling threads in a deterministic and preemptive manner using said instruction slices.

24. The data processing system of claim 23, said processor further comprising logic for:

specifying the number of instructions N included in an instruction slice, wherein a number of instructions in an instruction slice is constant and represents a subset of the total number of instructions in each thread such that a single thread may comprise multiple slices;

setting an instruction counter to N at the beginning of processing of each instruction slice;

tracking the number of instructions of a thread that is executed utilizing said instruction counter; and generating an interrupt to halt processing of a particular thread when N instructions have been executed to enable scheduling of a next thread for processing.

25. The data processing system of claim 24, said processor further comprising an instruction counter and logic for executing a thread until said thread executes N instructions.

26. The data processing system of claim 25, said processor further comprising logic for executing said thread until said thread stops to wait for a synchronization variable, wherein another thread is scheduled for execution and said thread is re-scheduled for execution after execution of an instruction slice of each other thread running on the processor.

27. The data processing system of claim 26, further comprising:

logic for identifying when the thread is no longer blocked and scheduling the thread for execution after the other threads running on the processor.

28. The data processing system of claim 24, said processor further comprising logic for executing a given thread until it stops to wait for input.

29. The data processing system of claim 24, further comprising logic for:

placing threads in a queue, wherein one slice of each thread is executed in the order of the threads in the queue followed by a next slice of the threads in said order until all instructions of each thread in said queue have been executed; and admitting new threads into said queue by utilizing an admission control window, wherein, said new threads are made to wait until the processor completes processing of slices of a set number of the threads within the queue and admits at least one thread waiting to be admitted to the queue.

30. The data processing system of claim 29, further comprising logic for:

defining a preset constant value corresponding to a number of instruction slices to be executed prior to admitting said new threads, said number of instruction slices constituting a time period between an opening of consecutive admission control windows;

holding newly generated threads in memory during execution of current instruction slices;

tracking a number of instruction slices executed by said processor and comparing against said preset value;

admitting new threads to said queue after a number of instruction slices equal to said preset value have been executed; and placing newly admitted threads at the end of the queue.

31. The data processing system of claim 24, wherein said processor provides cyclical debugging and includes logic for:

tracking points at which threads are admitted and inputs received during an initial run of the threads of a program, said inputs including both internal inputs and external inputs;

admitting threads at the same point in each subsequent run as in the initial run; and providing the same input in each subsequent run as in the initial run to facilitate cyclical debugging of said program.

32. The data processing system of claim 24, wherein said logic components of said processor are software logic components.

33. The data processing system of claim 32, wherein said software logic components are program code stored on a computer readable medium accessible to said processor.

* * * * *